April 30, 1929.  J. B. KILBURN  1,711,268
CAR SEAT
Filed July 2, 1926  4 Sheets-Sheet 2
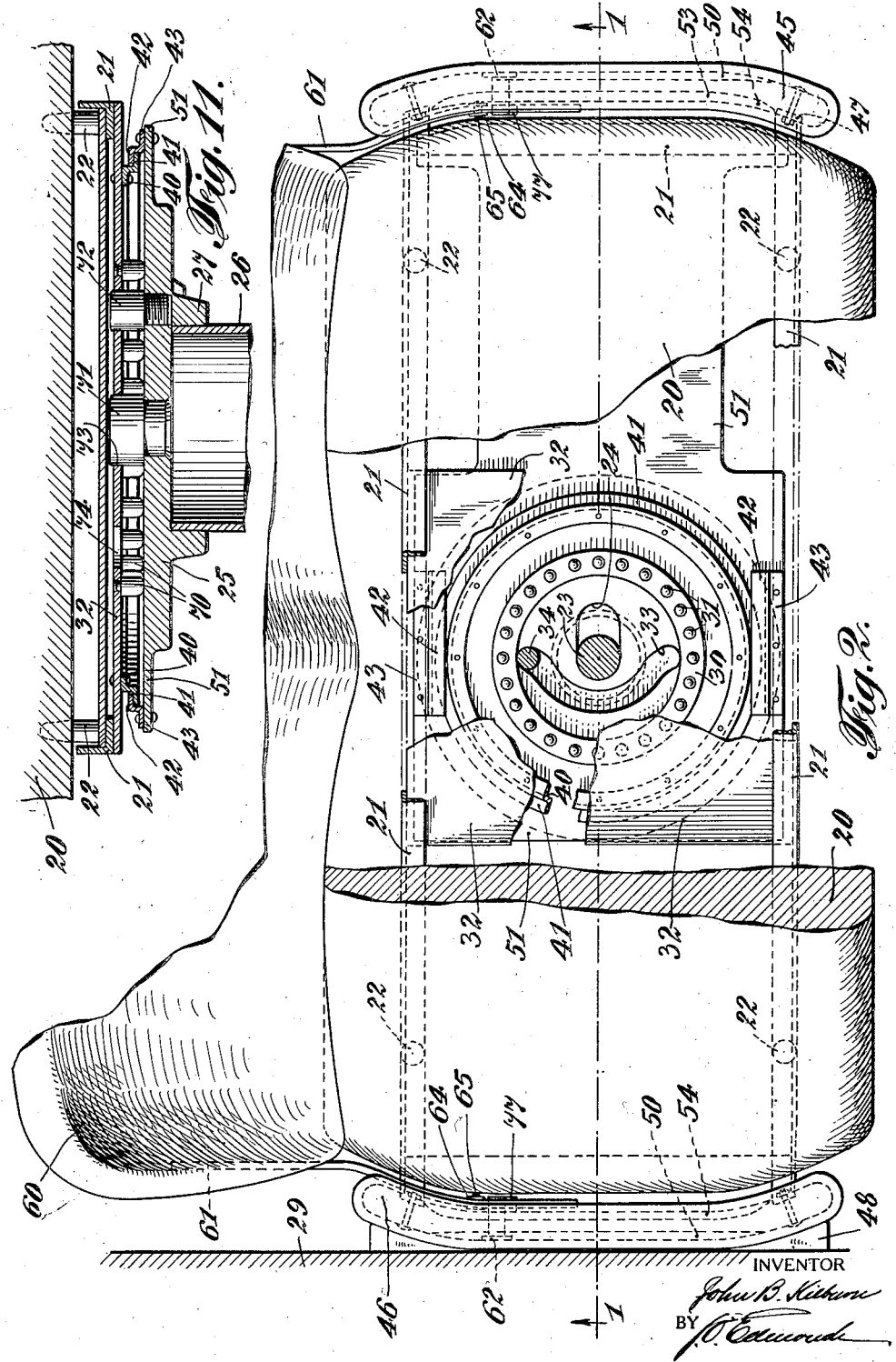
INVENTOR
John B. Kilburn
BY
ATTORNEY

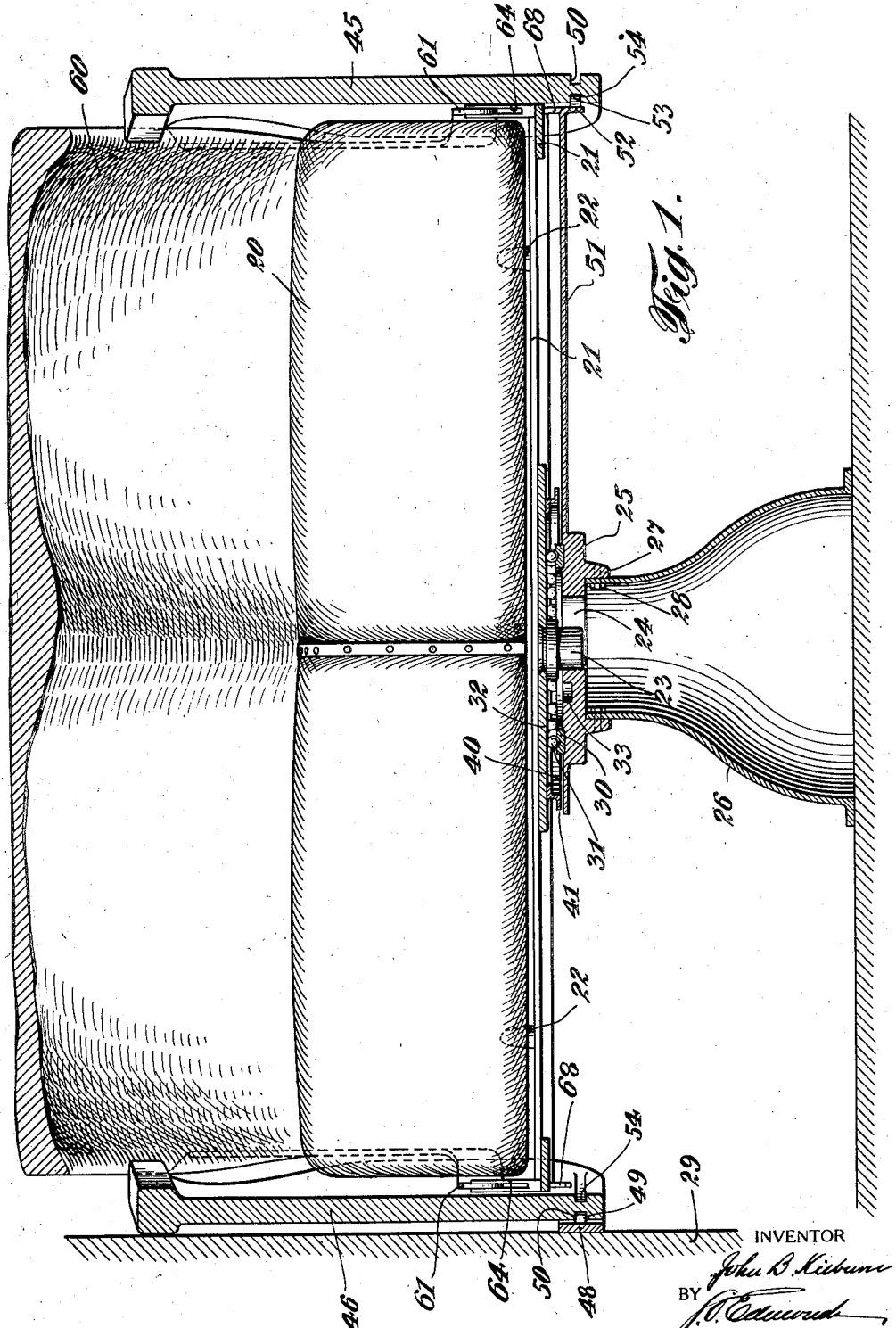

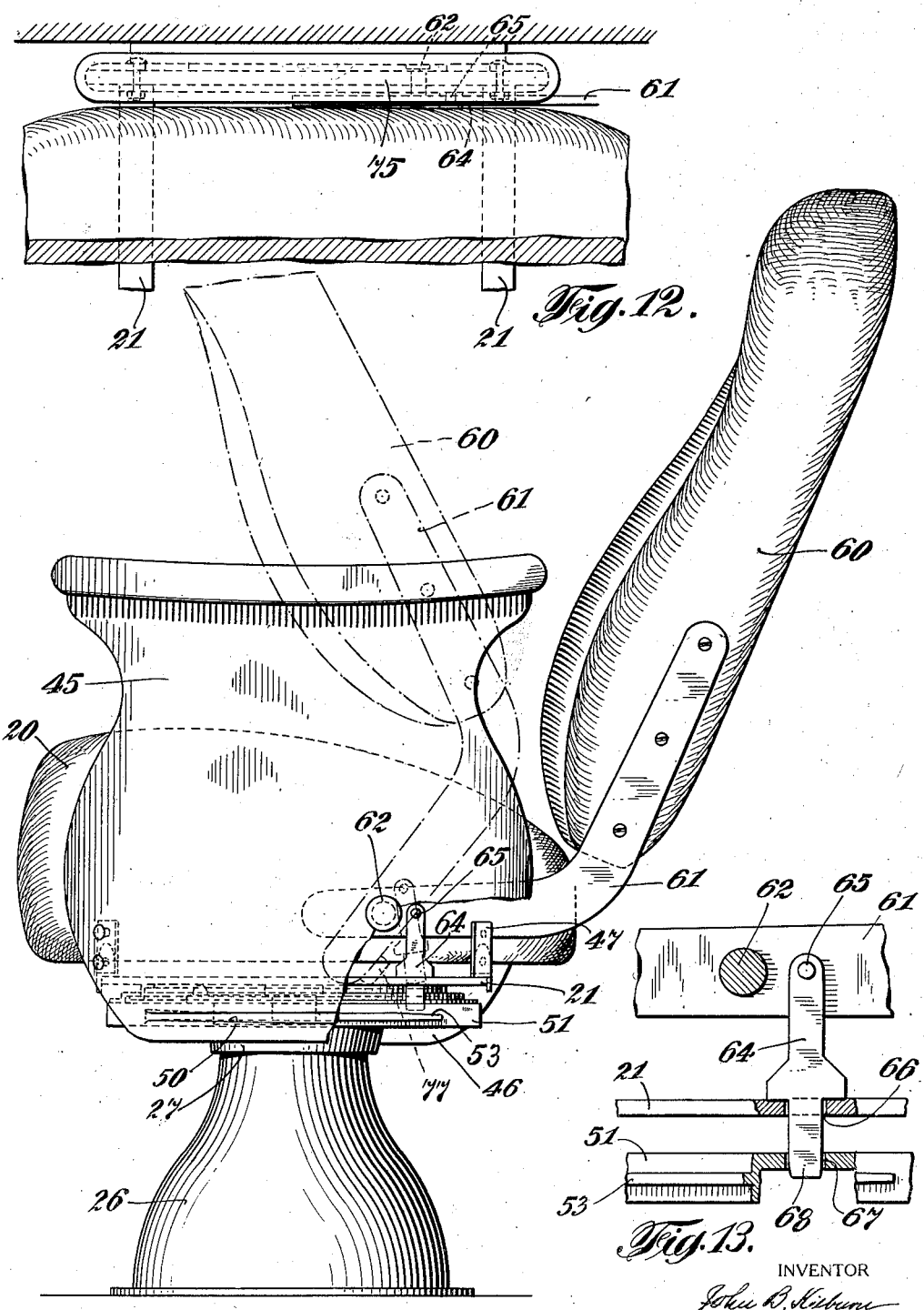

April 30, 1929.  J. B. KILBURN  1,711,268
CAR SEAT
Filed July 2, 1926  4 Sheets-Sheet 4
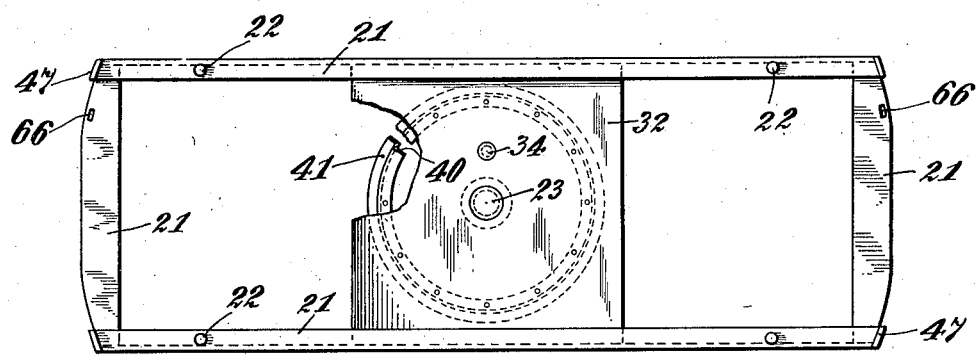
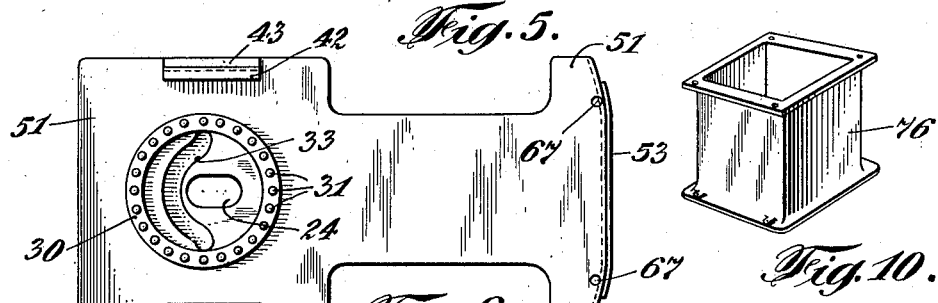
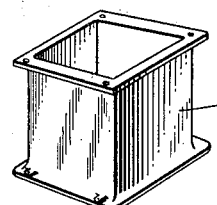
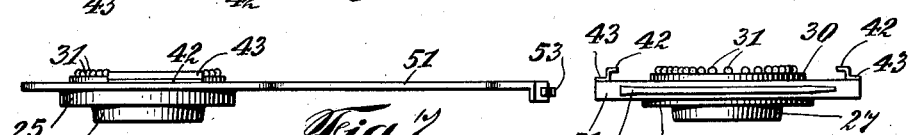
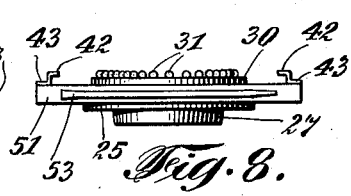
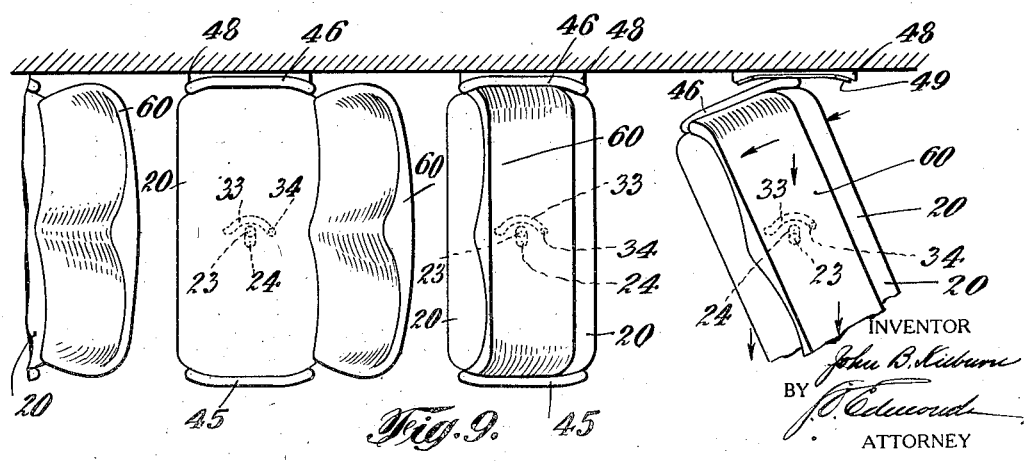
INVENTOR
John B. Kilburn
BY
ATTORNEY Patented Apr. 30, 1929.

1,711,268

UNITED STATES PATENT OFFICE.

JOHN B. KILBURN, OF OCEAN CITY, NEW JERSEY.

CAR SEAT.

Application filed July 2, 1926. Serial No. 120,079.

This invention relates to car seats, and more particularly relates to seats for railway and tram coaches as distinguished from parlor cars, club cars, observation cars, and the like, and relates to seats which may be revolved in a horizontal plane to face toward either end of the coach.

The most salient problems to be met in this art include providing a coach with seating accommodation for a maximum number of passengers; making the seats comfortable, steady and sturdy; arranging them so that they may be faced toward either end of the car, since most passengers object to riding backwards; arranging for the easy and convenient reversal of the seats by the trainmen; and providing seats which have an appearance creating an impression of attractiveness, comfortableness, and security.

In order not to lessen the seating capacity of a coach below the normal (72 to 80 passengers per coach), each seat must be confined to a small space and the seats must be placed close to each other. Preferably each seat accommodates two passengers.

The ease and comfort of the seat depends to a great extent on the depth of the springs and upholstery and the pitch of both the cushion and the back. To obtain maximum ease and comfort, the cushion and seat back must remain relatively in the same position, whichever way the seat is facing.

The most popular type of seats has been adapted to accommodate two passengers and to be reversed by moving the seat back over the seat cushion from one side to the other, with the accompanying movement of the seat cushion in a reverse direction to the movement of the seat back. Also, some coaches have been equipped with stationary seats not adapted for reversal. Reversible seats of the type referred to have been lacking in comfort, since the backward and forward movement of the back over the cushion precludes their being equipped with deep and luxurious upholstery. These seats necessarily require comparatively thin cushions and thin backs, and the spring and upholstery space is so limited that a very comfortable seat cannot be made without making the seat so large that it will objectionably limit the number of seats per coach.

Stationary seats have permitted deep and luxurious upholstery, but have forced the occupant to ride backwards when the coach is traveling one way.

The ordinary parlor car chairs revolve in a horizontal plane and have deep and comfortable upholstery, but these take up a great deal of space, permitting usually no more than twenty-five single seats per car, as compared with seventy-two to eighty seats in the ordinary passenger coach.

Accordingly, it is apparent that each type of seat referred to has serious limitations and objections. The reversible seats lack comfort comparable to the parlor car chair. The parlor car chair limits the seating capacity much below that obtainable with reversible or stationary seats. Stationary seats cannot be faced in either direction to correspond with the direction in which the coach is moving.

The principal object of my invention is to provide a seat for railway and tram coaches, and the like, which overcomes the above noted objectionable features of reversible coach seats, parlor car seats and stationary coach seats, and at the same time to provide a coach set which meets the problems above mentioned in a satisfactory and efficient manner. In short, the principal object of my invention is to provide a coach seat which embodies greater ease and comfort than any heretofore produced, and at the same time conserves seating space to the utmost, and permits facing in different directions.

A further object of my invention is to provide a coach seat of the character described, which is simple, sturdy and durable in construction, and easy to install in a railway coach, tram car, or the like, and easy to revolve.

Other objects of my invention will be in part obvious and in part pointed out hereinafter.

In accordance with my invention, my seat is of such construction that it will accommodate two passengers comfortably and will occupy so little space in the coach that comfortable seating accommodations may be provided in the ordinary passenger coach for the usual number of passengers, that is, seventy-two to eighty. At the same time, to retain great depth of springs and upholstery and comfortable pitch for both cushion and back when the seats are mounted close enough together to accommodate the usual number of passengers in a coach, the seat is not of the reversible type, but revolves instead, and to permit of this revolution to change the facing direction of the seat without requiring much space, I construct the seat so that as it begins to turn it will move outwardly from the car wall, to avoid interference between the corners of the seat and the top of the seat back with the wall. The construction automatically brings the end of the seat close against the wall when the seat arrives at the final point of rotation. To accomplish this movement, the seat is mounted for rotation on a pivot, and at the same time shifts bodily toward and from the car wall in a predetermined manner during turning.

The seat may be constructed with a back which is movable into alignment over the cushion when the seat is to be revolved, to permit still greater incline or pitch to the back, with a limited outward movement of the seat from the car wall. However, if preferred, the seat back may be non-tiltable, and the extent to which the seat is moved outwardly from the wall arranged to obtain clearance between the top of the back and the car wall when the seat is revolved.

If it is desired that the seat have arm rests, these may be provided to revolve with the seat. The seat may be supported for movement either on a central pedestal or on cross rails secured at one end to the car wall, or to a pedestal thereat, and at the other end to a pedestal at the aisle end of the seat.

Preferably, locking means are provided which prevent the seat from being revolved after it has been turned to face either end of the car. These means may be connected with the seat back so as to become released when the seat back is tilted preparatory to revolving the seat.

In order that a clearer understanding of my invention may be had, attention is hereby directed to the accompanying drawings, forming a part of this application and illustrating certain possible embodiments of my invention.

Referring to the drawings:

Fig. 1 is a vertical longitudinal sectional view of a seat embodying my invention, and is taken on the line 1—1 of Fig. 2;

Fig. 2 is a top view of the same, partly broken away, and showing the location of various parts in dotted lines to more clearly bring out the construction;

Fig. 3 is an end view of the seat, showing in dot and dash lines the seat back in tilted position;

Fig. 4 is a top plan view of the cushion rest which revolves with the cushion;

Fig. 5 is a side view of the same;

Fig. 6 is a top plan view of the supporting frame, on which the cushion rest revolves;

Fig. 7 is a side view thereof;

Fig. 8 is a sectional view thereof, and is taken on the line 8—8 of Fig. 7;

Fig. 9 is a diagrammatical view, showing the location of a plurality of seats in a line, facing in different directions and one partially turned;

Fig. 10 is a perspective view of a square pedestal, on which the seat may be supported;

Fig. 11 is an enlarged sectional view of a fragment of the construction, including a portion of the cushion, cushion rest, frame and pedestal, and showing pins in place of the ball bearings shown in Fig. 1, the king pin and cam pin in this instance being rigidly fixed to the frame instead of to the cushion rest;

Fig. 12 is a top view of an end fragment of the construction, showing a straight arm rest instead of an arm rest which is curved; and Fig. 13 is an enlarged detail of the means for latching the seat against revolution.

Similar reference characters refer to similar parts throughout the several views of the drawings.

Referring to the drawings, the seat includes a seat cushion 20, having great depth of spring work and upholstery and being considerably thicker at the front edge than at the rear, which is the well-known design of a cushion giving maximum comfort and ease. This cushion is mounted on a cushion rest 21, which comprises a flat frame of suitably rigid and preferably light material. This frame 21 fits underneath the cushion, and has dowel pins 22 in engagement therewith, so that the cushion and cushion rest will rotate together. At the center of the cushion rest is secured a depending stud or pin 23, which extends into a slot 24 formed in the center of a frame 25, which is rigidly mounted on a pedestal 26, or other suitable support. As shown in Fig. 1, frame 25 has an annular depending flange 27, which is bolted to the top of the pedestal, as at 28. Slot 24 extends horizontally at right angles to the plane of the car wall 29, so that the king pin 23 may not only revolve on frame 25, but also move therein toward and away from the car wall. About slot 24 on the frame 25 may be provided a ball race 30, provided with ball bearings 31, on which rest a plate 32 attached to the cushion rest 21, to reduce friction in turning the seat on the frame. Extending halfway around the slot 24, and at the car wall side thereof, is a cam slot 33, in which engages a pin 34, which is rigidly secured to the bottom of the cushion rest 21. The coaction between the pin 34 and cam slot 33 is such that, on initial rotation of the seat, it will be shifted bodily away from the car wall a sufficient distance to avoid interference between the seat cushion and seat back with this wall. The coaction between the pin 34 and the slot 32 is such that when the seat is in either position of final rotation, one end will be positioned closely against the car wall.

To retain the seat against being lifted off the pedestal and to take the strain off the center pin during rotation, a flange plate 40 may be secured to the underside of cushion rest 21, this plate having a flange 41, which engages beneath flanges 42 of coacting plates or strips 43 secured to the frame 25.

Although the construction above described will give the desired motion to the seat to cause it to clear the car wall on revolution, it is desirable to steady the seat at its ends to prevent teetering, and also to take the strain off the center when in position for use. To this end, I secure plates, or the like, which may be extended to form or to carry arm rests, 45 and 46, rigidly to opposite ends of the seat, as by bolting them to projections 47 formed on the end of cushion rest 21. To the car wall I secure a strip or plate 48, which has a projection 49, and provide each arm rest with a recess or groove 50 on the outside, which engages the projection 49 and supports whichever end of the seat is at the wall. I provide the frame 25 with an arm 51, which extends toward the aisle of the car. This arm has a downwardly flanged end 52, which carries an outwardly presented projection 53, and each seat end 45, 46, is provided with a recess or groove 54, which engages the projection 53 and supports whichever end of the seat is at the aisle. The projections 49 and 53 may be quite extended, and thus support the seat ends over a considerable distance. The recesses always approach the wedge strips 49 or 53 from the same end. I taper the wedges and strips endwise, so that a wedging action will be established, and in this way obtain rigidity and steadiness at both ends of the seat, irrespective of which way the seat is facing.

If the seat back is to be tiltable to aid in avoiding its interfering with the car wall when the seat is revolved, the seat back 60 may be provided at each end with an angular standard 61, each pivoted to an end plate, as at 62.

To prevent accidental or unauthorized revolving of the seat, a depending finger or lock bar 64 may be pivoted, as at 65, to each seat back standard rearwardly of its pivot point 62. The cushion rest 21 and frame arm 51 are provided with apertures 66 and 67, which come into alignment with each other when the seat is in either final position of rotation. The finger 64 has a bolt portion 68, which penetrates both these apertures when the seat back is in lowered position, to prevent the seat being revolved until the seat back has been tilted forwardly sufficient to withdraw the bolt 68 from the recess 67 of the frame member. Bolt 68 need not be withdrawn from the recess 66, since it revolves therewith.

Instead of providing ball bearings intermediate the cushion rest 21 and the frame 25, the ball bearings may be replaced by pins 70 (see Fig. 11) having rounded ends resting on the upper surface of frame 25. Also, instead of securing the king pin and cam pin to the cushion rest for movement in slots formed in the frame, the main pivot pin 71 and the cam pin 72 may be secured to the frame member 25 to operate in slots 73 and 74 formed in the cushion rest 21.

Instead of providing arm rests which are curved, as shown in Fig. 2, the arm rests may be straight, as shown at 75 in Fig. 12. The arm rests may be either of wood or of suitable metal construction, as desired.

The central pedestal may be of any suitable shape. A square pedestal 76 (see Fig. 10) may be employed instead of the round pedestal shown in Figs. 1 and 3. The central pedestal may be omitted entirely, in which case the frame 25 extends the full length of the seat and has one end secured to the car wall or to a pedestal thereat and its other end secured to a pedestal at the aisle end, in the manner shown in my application filed on even date herewith, Serial No. 120,078 (Case A).

To revolve the seat, the seat back is pushed forward until its top comes in line with the center of the cushion longitudinally, as shown in dot and dash lines in Fig. 3. This will disengage the bolt 68 from the frame member 51. Suitable stops 77, secured to each arm rest, prevent movement of the seat back past this position. Since the seat back is usually tilted by a trainman grasping the top of the seat back at the aisle end, a continuation of the push against the back will urge the seat to revolve on its pivot. However, engagement of the cam pin 34 in the cam groove 33 causes the seat to move bodily away from the car wall as the seat begins to revolve. The trainman continues to revolve the seat until it is facing in the opposite direction, and as the seat arrives in this position, the coaction between the cam pin and cam slot causes the seat to move closely against the car wall. At the same time, the recesses in the end plates engage the wedge projection with a wedging action. When the seat has been revolved, the seat back is lowered into normal position. This will cause the lock 68 at the aisle end to engage in the frame aperture 67 and lock the seat against revolving unless the seat back is tilted.

Obviously, the seat may be given more or less amount of movement away from the car wall and back again by merely changing the shape of the cam slot 33 and making the slot 24 of suitable length to accommodate the corresponding movement of the main pivot pin.

It will also be apparent that the pitch of the back may be so arranged in connection with the amount of movement of the seat away from the car wall that the seat back may be rigidly secured to the cushion instead of for tilting with respect thereto. In either case, the seat back may be provided with deep and luxurious upholstery as well as with a pitch which gives maximum ease and comfort, and may be curved in shape with projecting wings at the top, to increase the comfort as a head rest. As before stated, the cushion is designed to use one front, and the construction permits of deep and luxurious cushion upholstery. At the same time, the space required in a car for a seat of this type is so small that enough seats of this type may be mounted in an ordinary passenger coach to provide for the accommodation of the ordinary number of passengers, that is, seventy-two to eighty.

From the above description, it will be apparent that a car seat may be constructed in accordance with my invention which meets all the problems noted above, and in particular embodies maximum ease and comfort, as well as attractiveness in appearance, steadiness and sturdiness, without reducing the seating capacity of ordinary passenger coaches, and at the same time permits the seats to be faced in either direction, so that all passengers may ride either forward or backward, as their fancy dictates. Other advantages will be readily apparent to those skilled in the art.

In view of the fact that my invention as above disclosed is capable of many modifications without departing from the scope of my invention, it is to be understood that all matter contained in the above description or shown in the accompanying drawings shall be interpreted as illustrative and not in a limiting sense.

The present application relates to similar subject-matter disclosed in two other copending applications filed on even date herewith. Cases A and C, Case A relating to a car seat which has no bodily translatory movement, and to seats which have translatory movement away from and toward an adjacent seat, and Case C relating to a car seat which has bodily translatory movement both away from an adjacent seat and also away from the car wall. The present application relates to seats of the same general character referred to in said copending applications, to which reference is specifically made hereby. In this application the seats have translatory movement away from the car wall but not from an adjacent seat.

What I claim is:—

1. In a car seat of the character described, in combination, a supporting frame, a cushion rest rotatably mounted on the supporting frame, a seat end secured to each end of the cushion rest for rotation therewith on the supporting frame, a cushion on the cushion rest, a seat back, back supporting standards pivoted to said seat ends, and releasable means engaging said cushion rest and supporting frame for preventing relative rotation therebetween, said means including pins pivotally carried on said standards and engageable in aligning perforations in said cushion rest and supporting frame.

2. In a car seat of the character described, in combination, a supporting frame, a cushion rest rotatably mounted on the supporting fame, a seat end secured to each end of the cushion rest for rotation therewith on the supporting frame, said seat ends having grooves, and stationary members at each end of the seat, each having a lip engaging in one of said grooves when the seat is faced in either of two opposite directions, whereby both ends of the cushion rest are supported.

3. In a car seat of the character described, in combination, a supporting frame, a cushion rest rotatably mounted on the supporting frame, a seat end secured to each end of the cushion rest for rotation therewith on the supporting frame, said seat ends having grooves, and stationary members at each end of the seat, each having a lip engaging in one of said grooves when the seat is faced in either of two opposite directions, whereby both ends of the cushion rest are supported, the grooves for the lip of one of said stationary members being on the inside of the seat ends and the grooves for the lip of the other stationary member being on the outside of the seat ends.

4. In a car seat of the character described, in combination, a supporting frame, a cushion rest rotatably mounted on the supporting frame, and a seat end secured to each end of the cushion rest for rotation therewith on the supporting frame, said seat ends having interior grooves and said supporting frame having an extension provided with a supporting lip engaging in one of said grooves to support the adjacent end of the cushion rest when the seat is faced in either of two opposite directions.

5. In a car seat of the character described, in combination, a supporting frame, a cushion rest rotatably mounted on the supporting frame, a seat end secured to each end of the cushion rest for rotation therewith on the supporting frame, a car wall adjacent one end of the seat, a supporting lip secured to the car wall, an extension on the supporting frame extending away from the car wall toward the other end of the seat, a supporting lip on the end of said extension, each seat end having an exterior groove engageable with the lip on the car wall and having an interior groove engageable with the lip on the extension, whereby both ends of the cushion rest are supported on said lips when the seat is facing in either direction parallel to the car wall.

6. In a car seat of the character described, in combination, a supporting frame having a perforation adjacent one end thereof, a cushion rest rotatably mounted on the supporting frame, and having a perforation adjacent each end thereof adapted to align selectively over the perforation in the supporting frame, a seat back, back-supporting standards pivotally carried on the cushion rest, and a pin pivotally carried on each back standard adapted to penetrate aligning perforations in the supporting frame and cushion rest when the seat back is in seating position, whereby the cushion rest is held against rotation on the supporting frame, said pin being adapted to be withdrawn from the perforation in the supporting frame when the seat back is tilted forwardly, to release the cushion rest for rotation on the supporting frame.

This specification signed this 21st day of June, 1926.

JOHN B. KILBURN.